ALLEN L. SIMISON &
CLAYTON A. SMUCKER
INVENTORS

ATTORNEYS

ALLEN L. SIMISON &
CLAYTON A. SMUCKER
INVENTORS

BY
ATTORNEYS

ALLEN L. SIMISON &
CLAYTON L. SMUCKER
INVENTORS

United States Patent Office 3,539,423
Patented Nov. 10, 1970

3,539,423
METHOD OF MAKING A FIBERBOARD OF VARYING DENSITY
Allen L. Simison and Clayton A. Smucker, Newark, Ohio, assignors to Owens-Corning Fiberglas Corporation, a corporation of Delaware
Continuation-in-part of application Ser. No. 527,116, Feb. 14, 1966. This application Nov. 12, 1968, Ser. No. 774,864
Int. Cl. B32b 7/02, 17/04
U.S. Cl. 156—209     7 Claims

ABSTRACT OF THE DISCLOSURE

A method of removing imperfections in the surface of a glass fiberboard wherein a thin layer of binder is applied to the imperfect surface of the board, and the board is held compressed until the binder is cured to provide a smooth tight high density surface without changing the density of the remainder of the board. The board so produced is also disclosed.

CROSS REFERENCES TO RELATED APPLICATIONS

This application is a continuation-in-part of our copending application, Ser. No. 527,116, filed Feb. 14, 1966, now abandoned.

BACKGROUND OF THE INVENTION

Boards made from randomly oriented fibers bonded together at points of contact by binders, and particularly boards of this type made from glass fibers, have a density much lower than wood and are used extensively as wallboards and/or acoustical boards. Where such boards are used for these purposes, it is necessary that they have surfaces of desired texture and color so as to provide a pleasing appearance. The fiberboards are made by spraying a water solution or dispersion of a thermosetting resin, and particularly a phenol-formaldehyde resin, onto a mat of randomly oriented fibers. The mat is held compressed between the flights of opposing conveyors, and upon heating and curing, a board having light weight and integrity is formed. It is exceedingly difficult to provide boards of this type which have uniform densities and surfaces because the fibers are not laid down uniformly in amount or orientation, and the water solutions or dispersions do not penetrate the mat uniformly. In addition, some of the binder and fibers stick to the conveyors to form valleys; and when this debris breaks lose from the conveyor and is deposited on the mat, hard projections result. The surfaces of the boards produced are therefore irregular and of an uneven texture, so that it has been necessary heretofore to sand the surface of these boards to a depth of approximately one eighth of the boards original thickness before applying paint and other decorative finishes. Each sanded piece must be individually inspected to determine that no flaws exist prior to being painted, and a high percentage of the boards are scrapped as unacceptable for painting and finishing. In addition, surface defects which are not apparent upon inspection before painting become apparent after painting, with the result that still additional boards are scrapped after material and time has been spent in painting the boards.

An object of the invention is the provision of a new and improved method of making bonded fiberboards, and particularly glass fiberboards wherein a high degree of surface uniformity is provided.

Another object of the invention is the provision of a new and improved board of the above-described type and having an exceedingly high bruise resistance.

Another object of the invention is the provision of a new and improved method of making decorative boards of the above-described type in which the amount of scrap is greatly reduced.

Another object of the invention is the provision of a new and improved apparatus which will produce boards of various surfaces and textures on a continuous basis using a starting board having surface irregularities therein.

Further objects and advantages of the invention will become apparent to those skilled in the art to which it relates from the following description of several preferred embodiments described with reference to the accompanying drawings forming a part of this specification.

SUMMARY OF THE INVENTION

According to the invention, a method of forming decorative fiberboards is provided in which the procedure used for providing a uniform surface on the structural portion of the board is separated from the manufacture of the basic structural board. This allows the board to be made with greater flexibility since the conditions used to produce the basic structural board, can be changed from those used to form the structural surface. The type of resin used to bond the fibers of the mat together and the manner of its application and cure can be optimized to give the highest strength backing at the lowest possible cost, while the resin and cure used to form the high density decorative surface can also be optimized without compromising the strength of the structural backing.

According to one aspect of the invention, a coating of a resin, particularly suited for the reception of paint and the like, is applied to a surface of a resilient fiberboard that may contain surface irregularities, and this resin, is cured while pressure is applied to the resin coated surface of the resilient fiberboard to deform the fibers of the board adjacent its surface and bond them together in their deformed condition. Where a smooth surface is desired, the pressing of a smooth surface against the coated surface of the board, deforms the fibers adjacent the surface coated with the resin to bend projecting fibers downwardly and smooth out irregularities. In most instances, the fibers adjacent the coated surface will be pressed downwardly by an amount greater than the depth of the depressions in the surface, and the board is cured in this condition. The board so cured produces a skin which does not change shape appreciably after cure so that a surface of desired contour is achieved even though irregularities existed in the surface of the board before the application of the resin and cure. It has been found that even though the method above-described uses two distinct operations for forming the decorative board, it can produce board more cheaply than prior art methods wherein a suitable surface for painting and finishing is attempted to be obtained at the time the basic board is produced. In addition, the method provides much greater flexibility in the type of surfaces which can be made, and the same finishing operation can be used to surface boards of different manufacture.

The coating of the resin that is applied stays generally in a layer forming an interface spaced inwardly from the surface of the board on which the resin was initially applied, and which separates the coating layer from the remainder of the board. The fibers from which the board is made project through the interface with the portion in the coating layer being deformed to a greater degree than the remaining portion of the fibers in the lower density board structure.

DESCRIPTION OF THE PREFERRED EMBODIMENTS

Figure 1:
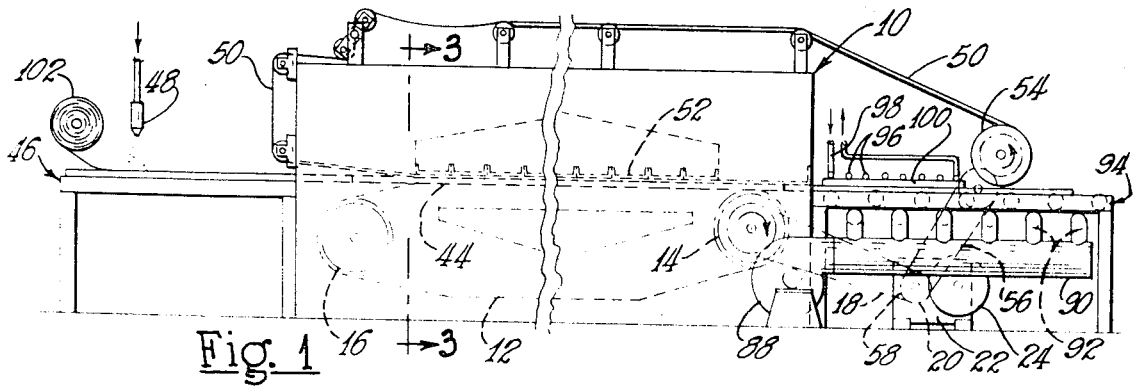
FIG. 1 is a side elevational view of apparatus embodying the invention and which will produce the improved products of the invention.
Figure 2:
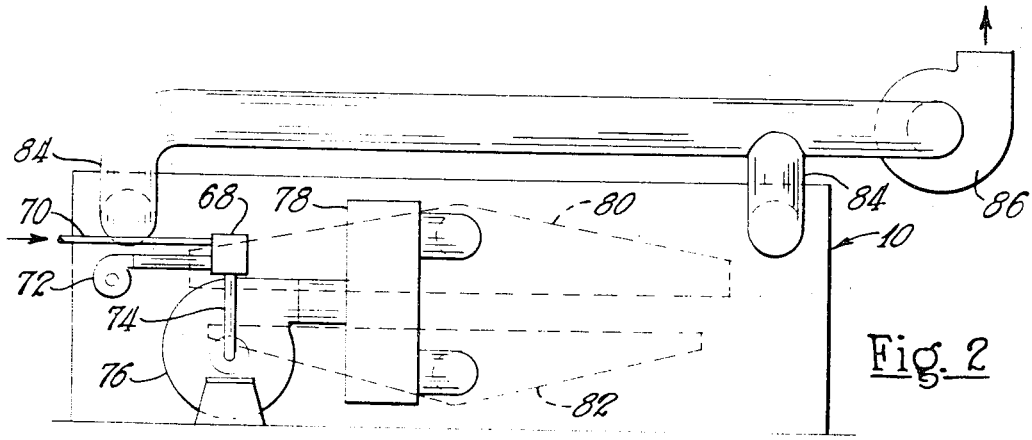
FIG. 2 is a side elevational view of the opposite side of the apparatus shown in FIG. 1.
Figure 3:
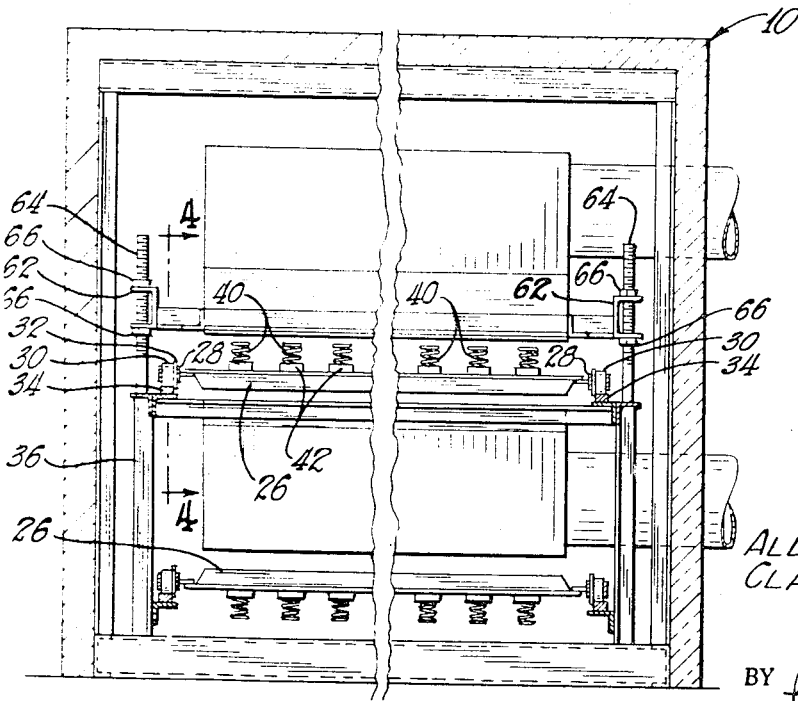
FIG. 3 is a sectional view taken approximately on the line 3—3 of FIG. 1.
Figure 4:
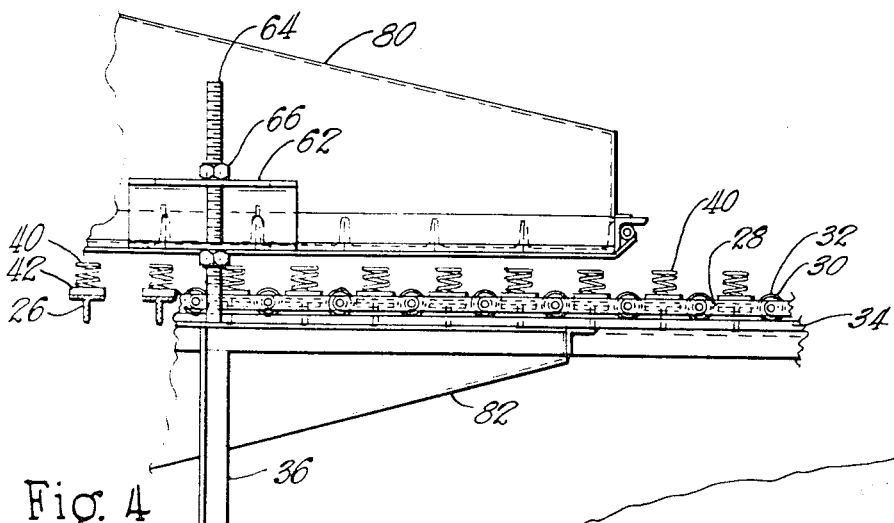
FIG. 4 is a fragmentary sectional view taken approximately on the line 4—4 of FIG. 3.

FIGS. 1–4 of the drawings show one form of apparatus which will perform the method of the present invention. The apparatus shown in the drawings generally comprises an oven 10 containing an endless conveyor 12 which passes around head and tail sprockets 14 and 16 respectively. The head sprocket 14 is driven from a drive chain 18 and sprocket 20, and the sprocket 20 is rotated by a gear reducer 22 that is driven by an electric motor 24. The conveyor 12 comprises a plurality of parallel, spaced apart T-bars 26 opposite ends of which are attached to chain links 28 of conveyor 12. Rollers 30 are pinned to opposite ends of the links 28. The rollers 30 have flanges 32 that are positioned laterally inwardly of rail bars 34 that are supported on a suitable frame 36, and which rail bars extend horizontally and lengthwise of the center section of the oven. The rollers 30 leaving the tail sprockets 16 ride up over the rail bars 34 and are thereby supported until they reach the vicinity of the head sprocket where the rail bars terminate to allow the rollers 30 to move downwardly around the head sprocket 14. The rollers can both ride upon the rail bars 34, and be received within the teeth of the head and tail sprockets. A plurality of springs 40 are spaced apart lengthwise of eacr T-bar on 3 inch centers and are secured to the bars by suitable clamps 42. The upper ends of the springs 40 have a full coil each of which lies in a common plane for the support of the fiberboards as will later be explained.

Fiberboards are fed to the top flight 44 of the conveyor 12 by means of a feed conveyor 46 shown diagrammatically in the drawings. Resins can be applied to the top surface of the boards while on the feed conveyor in various manners, and in the preferred embodiment shown in the drawings, the resins are applied as a water dispersion by means of the spray nozzles 48. The boards which have had resins applied are thereafter fed into the oven 10 and are placed upon the top surfaces of the coil springs 40. The resins preferred are thermosetting resins, and during passage through the oven 10, these resins become linked to a thermoset condition.

According to the invention, the resins which are applied to the surface of the fiberboard are caused to polymerize to their thermoset condition while the fibers of the top surface of the board are deformed downwardly into the body of the board. This causes any projecting fibers to be made flat and, in addition, sufficient force is applied to the board to press raised areas of the fibers to below the level of the bottom of the low spots normally encountered. By setting the resin while the fibers adjacent the top surface of the board are in a deformed condition, various textures including a smooth surface can be achieved.

In the apparatus shown in the drawing, the fibers adjacent the top surface of the boards are deformed by means of a moving belt 50 which is held down against the top surface of the boards by a platen 52 that is positioned above the tops of the coil springs. The belt 50 is positioned from the uncompressed condition of the coil spring by a distance less than the thickness of the board being fed to the conveyor. The belt 50 passes through the oven 12 to a head roll 54 and then backwardly over the top of the oven to its inlet end. The roll 54 is preferably driven to provide a peripheral speed slightly in excess of the speed of the conveyor 12 so that slippage results. The belt is tensioned so that this slippage will overcome friction of the belt over the stationary surfaces but will not slide the belt relative to the fiberboards carried by the conveyor 12. The head roll 54 of the apparatus shown in the drawings is driven by a drive chain 56 and a sprocket 58 that is in turn driven by the gear reducer 22.

The platen 52 can be made in any suitable manner which will provide a uniform hold-down force to the top surface of the belt, and as shown in the drawings, is formed by a plurality of aluminum channels 60 the backs of which lie in a common plane. The ends of the channels 60 are secured to the backs of longitudinally extending channels 62. The channels 62 are in turn adjustably supported by threaded posts 64 which project upwardly from the frame 36 through the horizontal legs of the channels 62, the position of which is adjusted by means of nuts 66 located above and below the channels 62.

While the inside of the oven 10 may be heated in any suitable manner, it is shown in the drawing as being supplied with warm air from a gas burner 68. Gas is supplied to the burner 68 through a conduit 70 and primary air is supplied to the burner by means of a blower 72. Products of combustion from the gas burner 68 are conducted through a conduit 74 to the inlet of a forced air blower 76 which mixes the products of combustion with secondary air and supplies them to a plenum chamber 78. The plenum chamber 78 conducts the heated air to top and bottom hoods 80 and 82 respectively positioned in the oven 12 above and below the topflight 44 of the conveyor. The top hood 80 supplies heat to the platen 52 while the bottom hood 82 causes the warm air to flow up through the mat and circulate past the resin and fibers in its compressed upper layer. The spent air is picked up by exhaust ducts 84 which lead to the inlet of an exhaust fan 86.

The heated boards are cooled after they issue from the oven 10 by means of a flow of cool air supplied by a blower 88, header 90 and transverse branches 92 which extend across the discharge conveyor 94 and have openings which direct the air upwardly through the boards. The belt 50 in the preferred embodiment remains in contact with the top surface of the boards while they are being cooled. The belt 50 in turn is cooled by means of radiant coils 96 positioned above the belt. The coils 96 are supplied with a flow of cool water through conduit 98. The coil conducts heat out of a cooling platen 100 which rests against the top surface of the belt to remove heat not only from the belt but from the skin that is formed on the fiberboards. It will be seen that the smooth belt 50 is only heated during its passage through the oven 10, and that it is immediately cooled thereafter prior to its return to the inlet of the oven 10. In the preferred embodiment, the belt 50 is made of an impervious sheet of Teflon[1] that is carried by a non-stretching backing material made of glass fibers. Resins do not adhere to the Teflon, and the Teflon is capable of providing a very smooth surface to the skin that is formed on the board.

Figure 5:
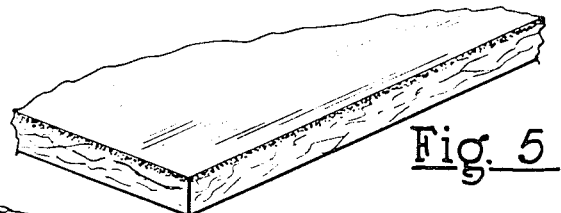
FIG. 5 is a fragmentary, isometric view of one embodiment of board of the present invention.

A preferred material, shown in FIG. 5, is made by the apparatus and method above-described by applying a water dispersion of a pigmented clear resin, and in particular a urea-melamine-formaldehyde resin, to the board by means of the sprayer 48 using a smooth surface Teflon coated belt 50. The water dispersion may contain from thirty to seventy percent solids. The following example sets forth the details by which the board of FIG. 5 is made:

EXAMPLE 1

A urea-melamine-formaldehyde resin comprising 80% urea-formaldehyde and 20% melamine-formaldehyde was made by the following procedure. Formalin and urea were mixed at room temperature in a ratio to provide a 3 to 1 mol ratio of formaldehyde to urea. The pH was adjusted to 7, and the mixture was then heated at 95° C. for 15 to 20 minutes. The mixture was cooled to 90° C. and the pH adjusted to 4.6. Formic acid in an amount equal to 1.5 lbs. per 100 gal. of the mixture was added, and the material was cooked to a Gardner-Hope viscosity of C. The pH was then adjusted to 7, and sufficient urea added to bring the mol ratio of formaldehyde to urea to 1.45 to 1. This mixture was held at 70° C. for 15 minutes, was then cooled to room temperature, and was transferred to storage. The mixture comprised 50% solids.

Thereafter a melamine-formaldehyde resin solution comprising 63% solids and having 3 mols of methylol per mol of melamine was added to the above described urea-formaldehyde resin material in a solids ratio of 30 parts[2] melamine-formaldehyde resin to 80 parts[2] urea-formaldehyde resin. This solution was mixed with pigment and asbestos fibers approximately ⅛ inch long to provide a mixture, the solids of which comprise 60% resin, 30% CaCO₃ pigment, and 10% asbestos fibers. Alternatively the pigment could consist of 1 part titanium dioxide and 2 parts calcium carbonate. Sufficient water was mixed therewith to provide a dispersion containing 40% solids and was applied evenly to the top surface of the boards at a rate of approximately 10 grams per square foot. The oven was operated so that the air supplied to the hoods 80 and 82 was at a temperature of approximately 350° F. The nuts 66 were adjusted so that a force of 500 pounds per square foot was applied to the phenol-formaldehyde bonded glass fiberboard to which the above material was applied. This board, prior to being coated, had a density of 10 pounds per cubic foot. The glass fibers of the board were bonded together with a phenol-formaldehyde thermosetting resin and had a binder content of approximately 10% by weight. The board was ¾ inch thick and was compressed to a thickness of approximately ⅝ inch by means of the springs 40. The conveyor 12 was operated at a speed of approximately 10 feet per minute, and the board so produced had a smooth uniform grayish-white appearance which could be easily covered with a single coat of paint to give a uniform chalk-white appearance. If desired, a silicone in an amount of approximately 0.02% of the resin solids can be added to the resin solution applied to the mat to prevent applied paint from penetrating excessively into the mat. Better paint coverage may thereby be had.

By way of comparison, boards made according to the prior art processes required a sanding operation to provide a surface which when painted is smooth. These prior art boards require at least two coats of paint to achieve the same whiteness as do the boards of the invention when a single coat of paint is applied thereto.

Figure 6:
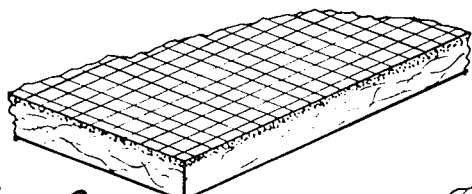
FIG. 6 is a fragmentary, view of another embodiment of board having high abuse resistance.

Another preferred embodiment of surface is formed by applying a mat of glass strands to the surface of the board preferably before being coated with the resin (see FIG. 6). It has been found that the use of a reinforcing material comprising glass strands of two hundred or more glass filaments bonded together and applied to the top surface of the board gives a surface having phenomenal abuse resistance. These strands extend at right angles to each other and can conveniently be applied in the form of a strand or scrim type mat or woven cloth from a roll 102 shown in FIG. 1. It has been found that strands of filaments bonded together when applied to the boards in the above-described manner are not broken by sharp concentrated blows and that the positioning of the strands immediately below the finish prevents paint, etc. applied thereto from showing cracks. Its abuse resistance can be shown by striking the surface of the board with ones fist following which no damage is apparent. Paint on the surface struck does not show cracks when struck either because depressions are not made, or the surface springs back to its original condition. By way of contrast prior art board, even when made with a scrim of glass filaments will have its surface punctured by a blow of the same severity. The scrim shown in FIG. 6 comprises ten warp strands and ten pick strands per inch. The strands of both the warp and the pick comprise 204 glass filaments each of which are approximately 0.0005 inch in diameter, and which are substantially untwisted but are held together by a binder, which in the present instance is starch. Still other glass scrims having other binders, such as plastics, can be used so long as they comprise strands of glass fibers extending in a substantially uncoiled manner in two directions. By way of contrast, it has been found that mats which are applied to the surface of fiberboards without being pressed down into the fibers of the board, are removed by sanding, grooving and beveling operations. A thin bonded fiber mat can be applied in place of the strands, however, to help provide a smooth surface. Such a board will not have as high abuse resistance as do boards having strands pressed into and bonded to the fibers of the board.

Figure 7:
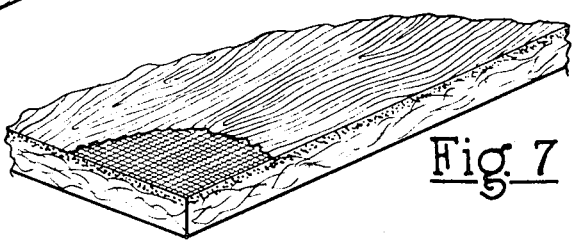
FIGS. 7–10 are fragmentary isometric views of still other embodiments of board.

Because the board of FIG. 6 has such phenomenal surface strength, it can be used as a light weight backing for delicate printed materials such as sheets of plastic that have printings of imitation wood grain thereon. One such material is shown in FIG. 7. The board of FIG. 7 is made by applying an unreinforced polyvinyl chloride film that has been printed with imitation wood grain, to the surface of a phenol-formaldehyde bonded glass fiberboard made as above-described. The boards so produced are stronger than when the same polyvinyl film backed with a conventional reinforcing is bonded to a phenol-formaldehyde board of the same type. Boards having a polyvinyl film can also be made by laying the film of thermo-plastic resin over the unsurfaced fiberboard, heating the film and board and passing them through the oven 10. In this instance, however, the oven 10 would no longer be used as an oven to heat the material, but would be modified to cool the film while it is held down against the fibers to bond the fibers together in their deformed conditions.

Figure 8:
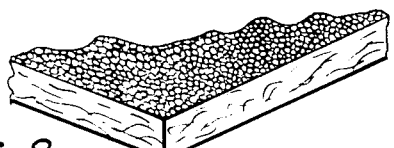
Figure 9:
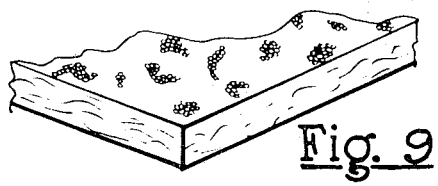
Figure 10:
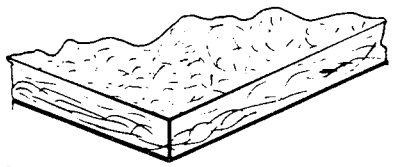

While the boards so far described, have smooth surfaces, various other textures can be easily provided. A dense but porous surface is formed by applying resin to the surface of the board as a resin coated particulate material. One suitable product is made, as shown in FIG. 8, when a phenol-formaldehyde novolac coated sand is sprinkled onto the top surface of the board in place of the spray provided by the nozzle 48. This resin coated sand is forced down into the surface of the board by the ---
[1] Teflon is polytetrafluoroethylene.
[2] All percentages and parts are percentages or parts by weight unless otherwise indicated.

belt 50 and platen 52 to smooth out the fibers. The resin coated sand is held together until it is bonded by the heat of the oven 10. The surface so provided will breathe when uncoated, and is an excellent surface for the retention of paint.

Where an embossed surface is desired, this resin coated sand can be sprinkled onto the surface of the board in any desired pattern, which after passing through the oven, is set into this configuration and can remain as raised surfaces to give an embossed effect. In addition, the belt 50 may be embossed instead of smooth as above-described so that boards formed either by spraying or by dusting can be made to have an embossed or textured surface. Still further pleasing effects can be had by allowing random glass filaments to fall upon the surface of the board either before being coated with the spray 48 or immediately afterwards. A board with an embossed surface is shown in FIG. 10. In another embodiment of the invention, a starch binder can be used in place of the thermosetting resin to hold the fibers together in their deformed condition. In some instances the mat 102 could be dip coated with the resin or otherwise caused to carry the needed bonding resin into position on the basic fiberboard. Tea bag paper has been found acceptable for use as the mat 102 in some instances. Other organic fibers, such as Vinyon fiber, can be used in some instances as well as mats of fibers bonded together with thermoplastic resins. It will also be understood that the invention can be used to provide a back surface to the board as well as a front surface. The invention makes it possible to control the porosity of the surface of the board. An impervious back surface will be useful for improving resistance to fire, etc.

Figure 11:
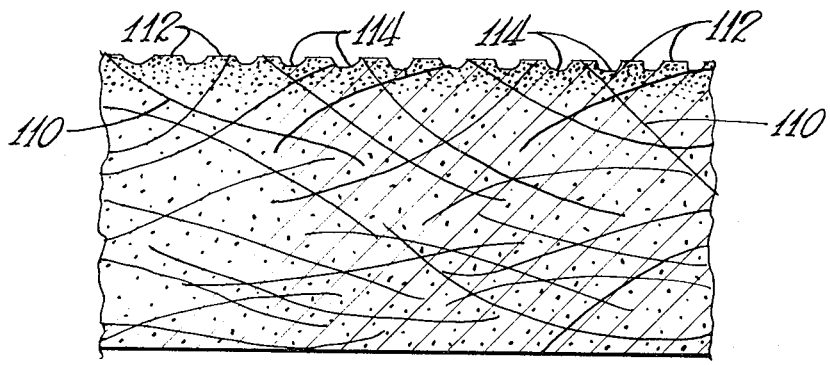
FIG. 11 is a diagrammatic fragmentary view showing fiber orientation of a board before impregnating with the coating resin and compaction and cure in the deformed condition.

FIG. 11 is a diagrammatic view showing a few of the fibers of a fiberboard before the finishing operation of the present invention. The original fibers are designated 110 with some portions of the fibers projecting out of the top surface of the board. The top surface of the board has projections or pimples 112 where openings existed in the conveyor which made the original board, and has depressions 114 where foreign material existed on the conveyor which made the original board.

Figure 12:
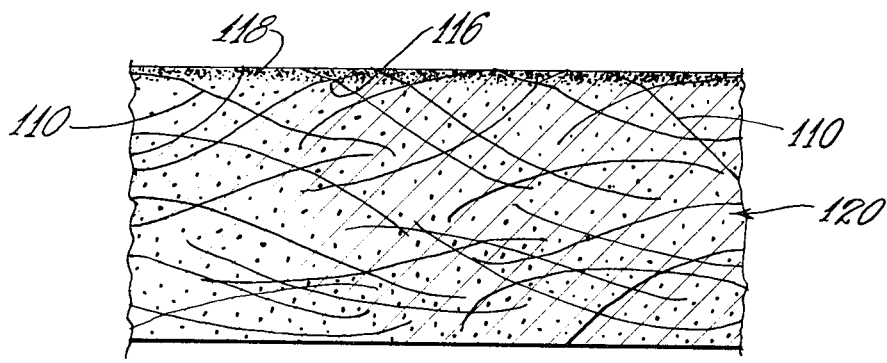
FIG. 12 is a fragmentary diagrammatic view after compaction and cure of the surfacing resin.

FIG. 12 is a diagrammatic view showing the board after the present invention. The surfacing resin which is applied stays in a layer which penetrates inwardly from the original surface, and which has an interface 116 spaced slightly inwardly from the original surface. The portion of the original fibers 110 which are embedded in the surfacing layer 118 are flattened and compressed to a greater degree than the portion of the fibers which project beneath the interface 116 to form the remainder, or the structural portion 120 of the board.

It will be apparent that the objects heretofore mentioned as well as others have been accomplished, and that there has been provided a new and improved method and apparatus for forming fiberboards which will provide the boards with a desired surface texture and strength, even though the starting boards contain surface irregularities. The method and apparatus produces such materials on a continuous basis without any appreciable waste, and the articles so produced have new and improved properties of greatly increased utility.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. A method of forming a bonded mineral fiberboard having improved coverability by paint, etc. and comprising: distributing a hardenable binder throughout a layer of the fibers of a fiberboard to provide an interface with respect to the remainder of the fiberboard, the fibers of said board being randomly oriented and bonded together at points of contact by a hardened binder, applying sufficient pressure to the board to deform at least a portion of the fibers of said layer without producing permanent compaction of the remainder of the board, and hardening said binder around the portion of said fibers in said layer only while said pressure is applied to hold said fibers of said layer in their deformed condition without holding the portion of the fibers in the remainder of the board in a correspondingly deformed condition.

2. The method of claim 1 wherein said applied hardenable binder is a thermosetting resin, and wherein heat is applied to said board while said pressure is held against its surface to cure said applied resin and hold fibers adjacent the surface of the board in a deformed condition.

3. The method of forming a mineral fiberboard having a lower density body and a higher density surface layer with an interface between comprising: causing a hardenable binder to be dispersed throughout at least the surface layer of a resilient single layered body of inorganic fibers, compacting said resilient body of inorganic fibers to a thickness less than the thickness of board where imperfections occur, hardening the binder in said surface layer only while said resilient body of fibers is under compaction, and removing compaction pressure to allow the board to expand to a final thickness that is greater than the compacted thickness and produce a body having portions of the fibers of the body extending through the interface between the surface layer and the remainder of the body with the more dense portion of the fibers in the surface layer being deformed and compacted to a greater degree than the less dense portion in the remainder of the body.

4. The method of forming a low density highly bruise-resistant mineral fiberboard comprising: distributing resin throughout a layer of fibers of a fiberboard inwardly from the surface thereof to an interface separating the layer from the remainder of the fiberboard while also laying a mat of bonded strands of glass fibers on said surface, applying sufficient pressure to the board to deform at least the portion of the fibers in said layer without producing permanent compaction of the remainder of the board, and curing said resin in said layer only while said pressure is applied to hold the portion of said fibers in said layer in their deformed condition without holding the portion of the fibers in the remainder of the board in a correspondingly deformed condition.

5. The method of claim 4 wherein the binder is a thermosetting binder and the method includes the step of: heating at least the surface layer of the body of fibers during the compaction step.

6. The method of producing a lightweight, bruise-resistant mineral fiberboard comprising: distributing a resin throughout a layer of the fibers of a fiberboard adjacent a surface thereof to an interface separating the layer from the remainder of the fiberboard while also laying a mat of bonded strands of glass fibers on said surface, applying a uniform pressure to the surface of the board to deform at least the portion of the fibers in the surface layer of said board adjacent said mat and smooth out its support of said mat without permanently deforming the portion of the fibers in the remainder of the board, and curing said resin in said surface layer only while said pressure is applied to hold the portion of said fibers in said surface layer in their deformed condition without holding the portion of the fibers in the remainder of the fiberboard in a similarly deformed condition.

7. The method of producing a glass fiberboard having a decorative surface comprising: impregnating a dispersion comprising a mixture of substantially clear thermosetting resin and a pigment into a surface layer of a fiberboard to provide an interface spaced inwardly from the surface of the fiberboard, applying sufficient pressure to the surface of the board to which the resin and pigment have been applied to deform at least the portion of the fibers of the surface layer without permanently deforming the remainder of the board, and applying heat to said surface layer while said pressure is held against its surface to cure resin in said surface layer only to hold the portion of said fibers of said surface layer in said deformed condition without holding the portion of the fibers in the remainder of the board in a similar degree of deformation.

References Cited

UNITED STATES PATENTS

| | | | |
|---|---|---|---|
| 3,328,086 | 6/1967 | Johnston | 297—461 |
| 3,276,928 | 10/1966 | Pearson et al. | 156—62.4 |
| 3,272,897 | 9/1966 | Herman et al. | |
| 3,265,530 | 8/1966 | Marzocchi et al. | |
| 3,230,995 | 1/1966 | Shannon | 161—36 |
| 3,222,237 | 12/1965 | McKelvy | 161—93 X |
| 3,141,809 | 7/1964 | Di Maio et al. | 161—124 X |
| 3,025,197 | 3/1962 | Sheidley. | |

ROBERT F. BURNETT, Primary Examiner

M. A. LITMAN, Assistant Examiner

U.S. Cl. X.R.

156—588; 161—146, 152, 164, 166, 170